US007281006B2

(12) United States Patent
Hsu et al.

(10) Patent No.: US 7,281,006 B2
(45) Date of Patent: Oct. 9, 2007

(54) SYSTEM AND METHOD FOR DIVIDING DATA INTO PREDOMINANTLY FIXED-SIZED CHUNKS SO THAT DUPLICATE DATA CHUNKS MAY BE IDENTIFIED

(75) Inventors: Windsor Wee Sun Hsu, Sunnyvale, CA (US); Shauchi Ong, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 686 days.

(21) Appl. No.: 10/693,284

(22) Filed: Oct. 23, 2003

(65) Prior Publication Data

US 2005/0091234 A1    Apr. 28, 2005

(51) Int. Cl.
    G06F 17/30    (2006.01)
    G06F 11/00    (2006.01)
(52) U.S. Cl. .............................. 707/6; 707/7; 707/101; 707/102; 707/103 Z; 707/104.1; 714/6
(58) Field of Classification Search ................ 707/200, 707/6, 7, 101, 102, 103 Z, 104.1; 711/159, 711/162; 714/6; 370/230.1, 470; 726/26
See application file for complete search history.

(56) References Cited

U.S. PATENT DOCUMENTS

| 5,020,058 | A | | 5/1991 | Hoden et al. ................ 370/109 |
| 5,600,316 | A | | 2/1997 | Moll ............................ 341/67 |
| 5,875,477 | A | * | 2/1999 | Hasbun et al. ............... 711/162 |
| 6,038,231 | A | | 3/2000 | Dolby et al. ................ 370/394 |
| 6,535,994 | B1 | * | 3/2003 | Kedem ........................... 714/6 |

(Continued)

OTHER PUBLICATIONS

T. D. Moreton, I. A. Pratt, and T. L. Harris, "Storage, Mutability and Naming in Pasta," Proceedings of the International Workshop on Peer-to-Peer Computing at Networking 2002, Pisa, Italy, May 2002.
A. Muthitacharoen, B. Chen, And D. Maziéres, "A Low-Bandwidth network file system", Proceedings of the 185h Operating Systems Review, (New York), pp. 174-187, ACM Press, Oct. 21-24, 2001.
Andrew Tridgell, "The rsunc algoritm", Technical Report TR-CS-96-05, The Australian National University, Jun. 1996.

*Primary Examiner*—Thuy Pardo
(74) *Attorney, Agent, or Firm*—Cantor Colburn LLP; Marc D. McSwain (57) ABSTRACT

A data chunking system divides data into predominantly fixed-sized chunks such that duplicate data may be identified. The data chunking system may be used to reduce the data storage and save network bandwidth by allowing storage or transmission of primarily unique data chunks. The system may also be used to increase reliability in data storage and network transmission, by allowing an error affecting a data chunk to be repaired with an identified duplicate chunk. The data chunking system chunks data by selecting a chunk of fixed size, then moving a window along the data until a match to existing data is found. As the window moves across the data, unique chunks predominantly of fixed size are formed in the data passed over. Several embodiments provide alternate methods of determining whether a selected chunk matches existing data and methods by which the window is moved through the data. To locate duplicate data, the data chunking system remembers data by computing a mathematical function of a data chunk and inserting the computed value into a hash table.

39 Claims, 7 Drawing Sheets

U.S. PATENT DOCUMENTS

| | | | |
|---|---|---|---|
| 6,615,209 B1 * | 9/2003 | Gomes et al. | 707/5 |
| 6,661,775 B1 * | 12/2003 | Nakayama et al. | 370/230.1 |
| 6,778,558 B2 * | 8/2004 | Balachandran et al. | 370/470 |
| 6,816,872 B1 * | 11/2004 | Squibb | 707/200 |
| 6,978,384 B1 * | 12/2005 | Milliken | 726/26 |
| 2002/0169934 A1 * | 11/2002 | Krapp et al. | 711/159 |

* cited by examiner (PRIOR ART)
FIG. 1

SYSTEM AND METHOD FOR DIVIDING DATA INTO PREDOMINANTLY FIXED-SIZED CHUNKS SO THAT DUPLICATE DATA CHUNKS MAY BE IDENTIFIED

FIELD OF THE INVENTION

The present invention generally relates to a method for dividing data into chunks so as to detect redundant data chunks. More specifically, this invention pertains to a method for dividing data that produces chunks of a predominantly uniform fixed size while identifying a large percentage of duplicate data.

BACKGROUND OF THE INVENTION

Data duplication is a common problem. As an example, numerous computer users have the same applications installed on their computers. In addition, when emails and attachments are forwarded, different users end up storing copies of the same emails and attachments. As computing and storage become more centralized, servers increasingly store the same data for many different users or organizations.

Furthermore, many different applications such as data archival require the servers to maintain multiple copies of largely identical data. If the duplicate information can be identified and eliminated, the cost of storing such duplicated information could be saved. In addition, if identical data in e-mails, attachments, or other similar objects that are transmitted over the Internet can be identified, less data can be transmitted, thus reducing the bandwidth required to send information over the Internet. For Internet businesses investing in hardware and infrastructure to transmit large amounts of data, the savings in eliminating duplicate information could be significant.

Certain conventional approaches to identifying duplicate data divide data into fixed-size units of data, or chunks, and check whether any such chunks are identical. Identical data, however, may not be stored at the same offset within the fixed-size chunks.

Figure 1:
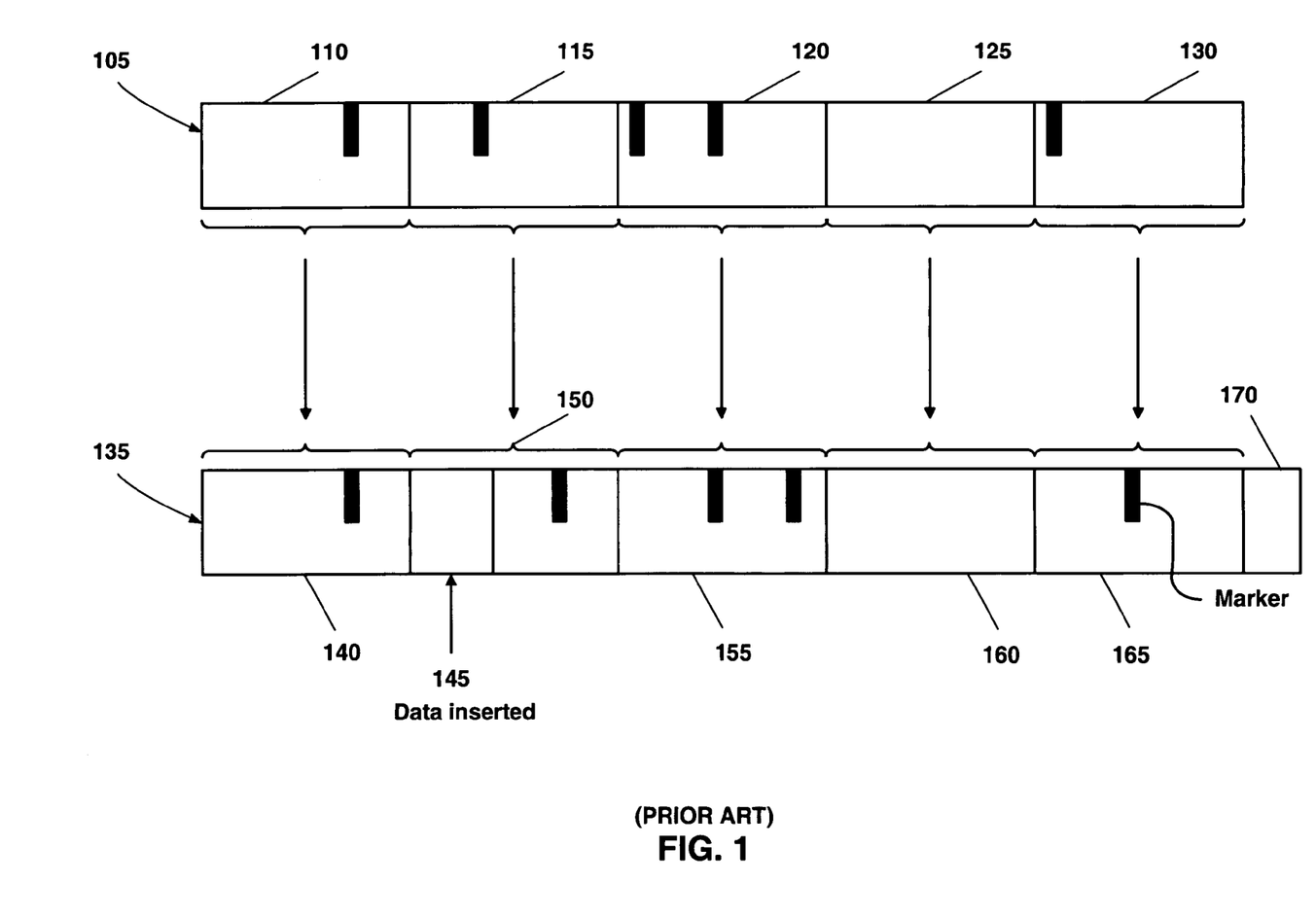
FIG. 1 is a diagram illustrating a conventional approach to data chunking using fixed-sized data chunks.

FIG. 1 illustrates a conventional approach to dividing or chunking data commonly referred to as the "blocking approach". With this approach, data stream 105 is divided into consecutive equal size chunks that are illustrated, for example, by chunks 110, 115, 120, 125, and 130. Each chunk represents a specific number of bytes of data.

However, this approach is not capable of handling the case where data is inserted in, or removed from the middle of a data stream, as shown when data 145 is inserted in chunk 115 to obtain the new data stream 135. When data 145 is inserted in chunk 115, the data of chunks 115, 120, 125, and 130 is displaced such that the chunks 150, 155, 160, 165, 170 of data stream 135 are somewhat similar, but are not identical to the chunks of data stream 105. When data 145 is inserted in chunk 115, the data of chunks 115, 120, 125, and 130 is displaced. Chunk 170 is an additional chunk that contains the data shifted from the end of chunk 130 by the introduction of data 145.

The data chunks are also affected if data is deleted from the middle of a data stream; wherein all the data after the modified chunk is displaced. The data after the modified chunk is identical to the corresponding data in the original stream, but the offset within the chunk is slightly different, so duplicates in the data cannot be identified. Consequently, although the data may be identical, very few chunks within the data are identical.

Another conventional approach to dividing data, namely data-based chunking or content-based chunking, identifies specific patterns or markers in the data, and identifies chunk boundaries based on those patterns. The marker selected for chunking may be any pattern as long as the same pattern is used for all the chunks. The marker may be a sequence of bytes such that some mathematical function of the data results in a certain bit pattern or it may be as simple as a full stop or a period. For example, each period in the data defines a chunk boundary. If periods are used as markers, the data is chunked into sentences.

Figure 2:
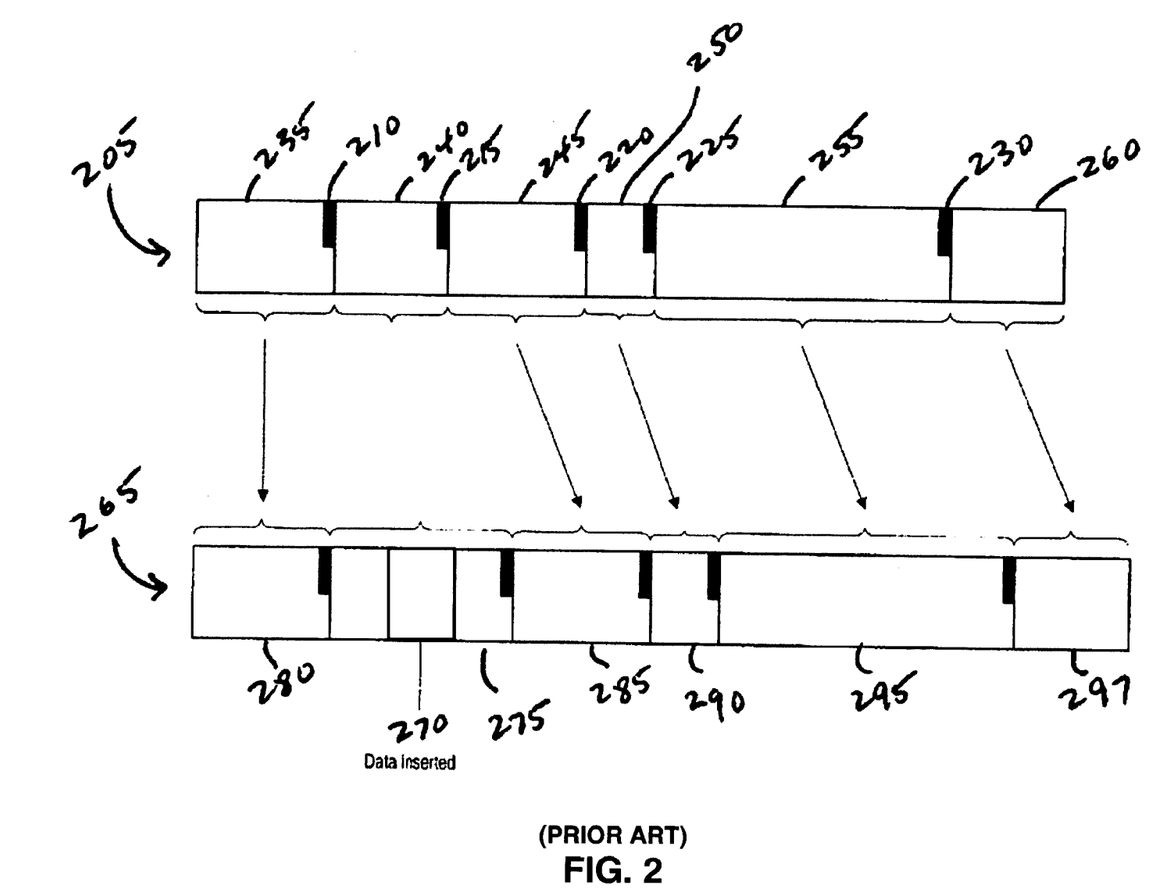
FIG. 2 is a diagram illustrating a conventional approach to data chunking using markers and variable sized data chunks.

FIG. 2 illustrates the data based chunking approach. Markers within data stream 205 are illustrated by markers 210, 215, 220, 225, 230. Markers 210, 215, 220, 225, 230 are used to divide data stream 205 into unequal sized chunks 235, 240, 245, 250, 255, 260. When data 270 is inserted in data stream 205 to obtain data stream 265, the data after the insertion point is displaced as before.

However, because the chunking is based on markers, chunks are displaced by the same amount as data 270. While chunk 275 has changed from chunk 240, the correspondence between chunks 245 and 285, chunks 250 and 290, chunks 255 and 295, and chunks 260 and 297, can still be identified.

Consequently, data-based chunking can identify many more duplicate chunks than the previous approach. However, it creates chunks with a wide variation in sizes, thus increasing processing and storage overhead and limiting the potential savings in storage. It becomes difficult to locate data when using data-based chunking. In addition, the selected marker may not appear in the data being chunked. As an example, the marker may be a period, when the document being chunked uses semicolon instead of a period. Consequently, data based chunking may also miss a significant number of duplicates.

What is therefore needed is a system, a service, a computer program product, and an associated method for dividing data into chunks that are predominantly of a predetermined size such that a large percentage of duplicate data may be identified and managed. Consequently, disk space for storing data may be reduced and bandwidth for transmitting data may be reduced. The reliability of data storage and network transmission may also be increased because if an error occurs, an identified duplicate can be used. The need for such a solution has heretofore remained unsatisfied.

SUMMARY OF THE INVENTION

The present invention satisfies this need, and presents a system, a service, a computer program product, and an associated method (collectively referred to herein as "the system" or "the present system") for dividing data into predominantly fixed-sized chunks such that duplicate data chunks may be identified.

The present system divides data into predominantly fixed-size chunks in such a way that the number of unique data chunks is reduced. The present system may be used to reduce the storage of duplicate data and save network bandwidth by allowing transmission of only unique data chunks. The system may also be used to increase reliability in data storage and network transmission, by allowing an error affecting a data chunk to be repaired with an identified duplicate chunk.

The present system chunks a given set of data (e.g., a file, object, groups of files or objects, file or object system) to increase the presence likelihood of identical chunks of a desired size. The present system can divide the set of data into any two sets and chunk the data such that there are likely to be many duplicate chunks within each of the sets and also between the two sets. Thus, this invention presents a more general solution than the conventional approach of dividing data to increase duplicate chunks between two sets of data.

The present system chunks data by selecting a chunk of fixed size, then moving or "sliding" a window of a fixed size, across the data stream until a match to existing data is found. As the window is moved across the data, unique chunks predominantly of the fixed size are created by the system in the data stream over which the window has moved. Several embodiments provide alternate methods of determining whether a selected chunk matches existing data and of controlling how the window is slid over the data stream.

To determine whether a selected chunk matches existing data, the present system remembers data chunks previously seen. In an exemplary embodiment, the present system computes a mathematical function of the data in a data chunk and inserts the computed value into a hash table. In a further embodiment of the present system, the mathematical function comprises a cryptographic hash.

In yet another embodiment, the present system uses series of tests to determine whether a selected chunk matches existing data, beginning with the test that is easiest to perform, but that is most likely to have false positives and using the next test if the first test returns a positive result.

In a further embodiment, the present system identifies specific patterns or markers in the data stream, remembers the neighborhood and offset of these markers in the chunks, and uses such information to control how the window is slid over the data stream.

The set of data to be processed by the present system may be incrementally increased over time. The remembered information may be stored in persistent storage such as disks. As new data is processed it may be added to the remembered information. In addition, the data to be processed may be geographically distributed. Consequently, the remembered information may be placed at different locations for efficient processing and storage.

The present system may be used as a service for companies, for example, to provide data storage for a fee. The present system maximizes data storage efficiency, allowing a company to reduce the cost of storage for either the company or the user, providing a competitive edge to a data storage company.

The present system may also, for example, be used by Internet service providers to reduce the cost of transmitting data over the Internet. By reducing the quantity of data transmitted, the time and bandwidth required to transmit data is reduced. This provides a competitive edge to Internet service providers using the present system because the cost of using the Internet is reduced.

The system may also be used to increase the reliability in data storage and network transmission, by allowing an error affecting a data chunk to be repaired with an identified duplicate chunk. More generally, the present system may be used in any application that benefits from the identification of redundant data.

BRIEF DESCRIPTION OF THE DRAWINGS

The various features of the present invention and the manner of attaining them will be described in greater detail with reference to the following description, claims, and drawings, wherein reference numerals are used, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Chunk: A unit of data.

Markers: Specific patterns in data used to divide the data into chunks. A marker may be as simple as a full stop or a period. For example, each full stop in the data defines a chunk boundary. If periods are used as markers, the data is chunked into sentences.

Fingerprint: A short tag for a larger object. Fingerprint has the property that if two fingerprints are different, then the corresponding objects are certainly different, and if two objects are different, then the probability for them to have the same fingerprint is very small.

Rabin's Fingerprint: A fingerprint computed by A(t) mod P(t) where A(t) is the polynomial associated with the sequence of bits in the object and P(t) is an irreducible polynomial.

Figure 3:
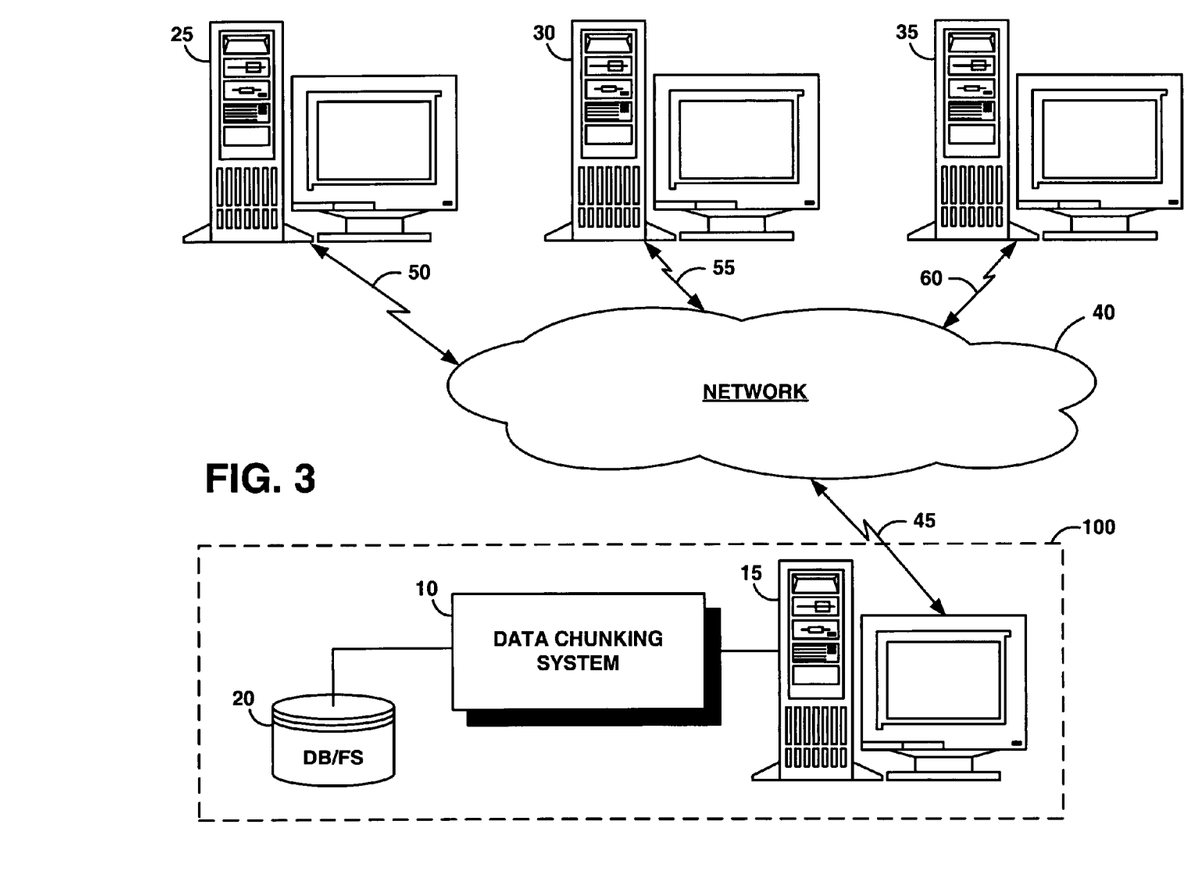
FIG. 3 is a schematic illustration of an exemplary operating environment in which a data chunking system of the present invention can be used.

FIG. 3 portrays an exemplary overall environment in which a system and associated method for dividing data into predominantly fixed-sized chunks according to the present invention may be used. System 10 comprises a software programming code or a computer program product that is typically embedded within, or installed on a host server 15. Alternatively, system 10 can be saved on a suitable storage medium such as a diskette, a CD, a hard drive, or like devices.

Data chunked by system 10 may be stored in database/file system 20 or transmitted over network 45 by host server 15. Users, such as remote Internet users, are represented by a variety of computers such as computers 25, 30, 35, and can access the host server 15 through a network 40. Computers 25, 30, 35 each comprise software that allows the user to interface securely with the host server 15. The host server 15 is connected to network 40 via a communications link 45 such as a telephone, cable, or satellite link. Computers 25, 30, 35 can be connected to network 40 via communications links 50, 55, 60, respectively. While system 10 is described in terms of network 40, computers 25, 30, 35 may also access system 10 locally rather than remotely. Computers 25, 30, 35 may access system 10 either manually, or automatically through the use of an application.

Figure 4:
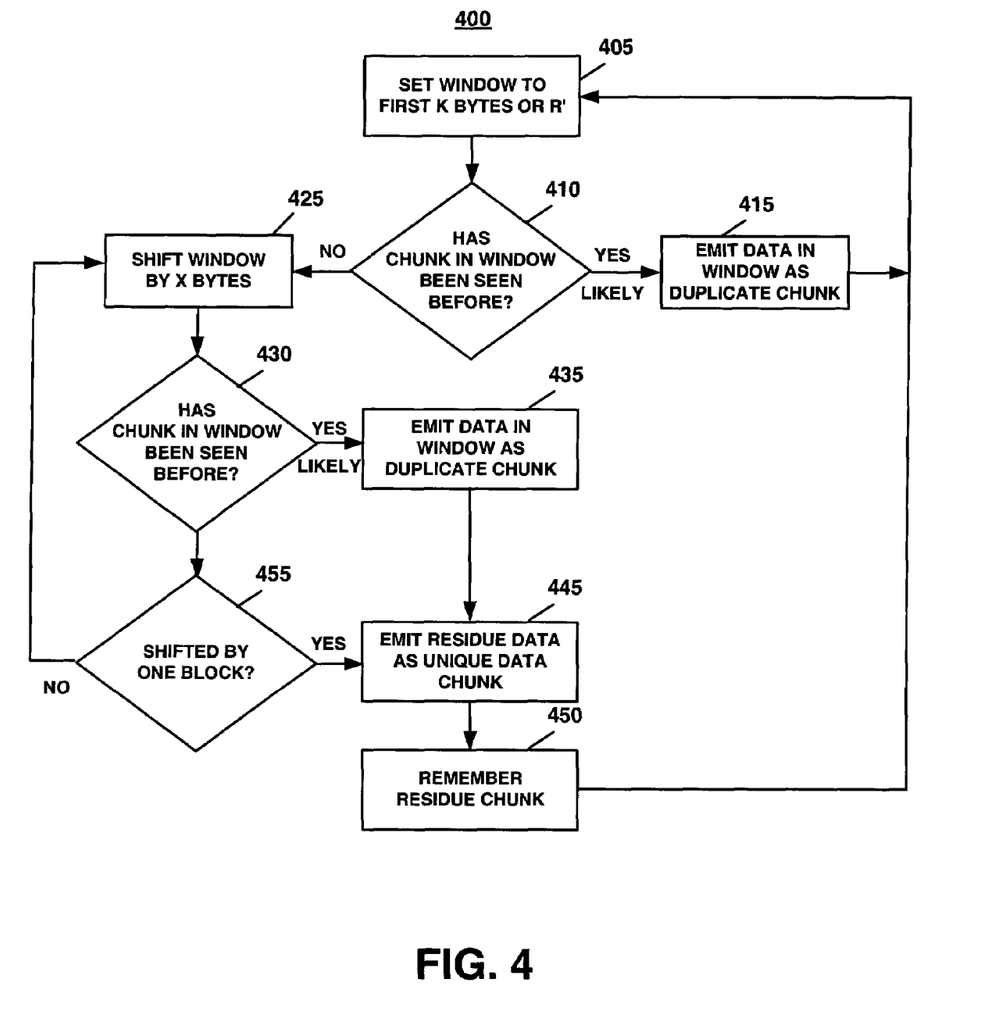
FIG. 4 is a process flow chart illustrating a method of operation of the data chunking system of the present invention.

FIG. 4 illustrates a method 400 used by system 10 for dividing data into chunks that are predominantly of a constant size, k bytes. A chunk of size k is referred herein as a block. Suppose a portion, R, of the data has already been processed. Let R' denote the data that has yet to be processed. Method 400 processes R' into chunks.

At step 405, system 10 sets a window of size k bytes on the first k bytes of R' and sets a residue chunk as empty. In a preferred embodiment, the value of k is the size of the unit of data management in the storage system storing the data being processed by system 10.

If at step 410, it is determined that the chunk of data in the window has been seen before (i.e., the chunk is a duplicate) or is likely to have been seen before, system 10 removes the chunk from R' and designate it as a duplicate or likely duplicate chunk at step 415, and returns to step 405 to select another chunk.

In one embodiment, in order to determine whether the chunk of data in the window has been seen before, system 10 computes a mathematical function of the data in the window and uses the computed value to look up a hash table. If the computed value for the data in the window already exists in the hash table, system 10 concludes that the chunk of data in the window is likely to be one of the chunks already remembered, i.e., the chunk is likely to be a duplicate or redundant chunk. In a preferred embodiment of system 10, the mathematical function is a cryptographic hash.

If, at step 410, the chunk of data in the window has not been seen before, the possibility is considered that the chunk may be duplicate data that has been offset by inserted or deleted data. To identify any offset, system 10 shifts (or slides) the window across R' by x bytes, for example, 1 byte (step 425).

System 10 does not move data, but rather moves the window over the data. The data passed over by the sliding window is collected in a residue chunk. As the window is moved, the residue chunk grows in size.

System 10 determines at step 430 whether the chunk of data in the window has been seen before. If the chunk of data in the window has been seen before or is likely to have been seen before, system 10 removes the chunk from R' and designates it as a duplicate or likely duplicate chunk at step 435.

If the residue chunk is not empty, System 10 removes the chunk from R' and designates it as a unique or likely unique data chunk at step 445. In a preferred embodiment, the ordering of the designated chunks is preserved by performing step 445 before step 435.

At step 450, system 10 remembers the residue chunk. In one embodiment, system 10 computes a mathematical function of the data in the residue chunk and inserts the computed value into a hash table. In another embodiment, system 10 only remembers the residue chunk if it is of size k.

At step 455, system 10 determines whether the window has been shifted by a complete block. If the window has not been shifted by a complete block, system 10 proceeds to step 425 and shifts the window by an additional x bytes.

If, at step 455, the window has been shifted by a complete block, the residue chunk is now the size of k. System 10 removes the residue chunk from R' and designates it as a unique or likely unique chunk at step 445. Again, system 10 remembers the residue chunk at step 450.

System 10 divides the data into chunks of size k or less, keeping the size of chunks near k. Chunking the data into predominantly k sized chunks reduces processing and storage overhead compared to conventional chunking approaches.

One of the uses of method 400 is to chunk data into chunks that are likely to be identical so that some savings may be obtained by storing or transmitting only the unique chunks. Therefore, in addition to chunking, system 10 may optionally identify which of the resulting chunks are identical and to which previously remembered chunk a given chunk corresponds to.

To this end, for each computed value in the hash table, system 10 tracks the address of the corresponding chunks. Then, in steps 410 and 430, if the computed hash value for the data in the window already exists in the hash table, system 10 reads the corresponding chunks and compares them with the data in the window to determine which, if any, of the chunks are identical to the data in the window. In the embodiment with a cryptographic hash used as the mathematical function, system 10 may elect to skip the read and compare of chunks with the same computed value because the probability of different chunks having the same cryptographic hash value is practically zero.

In an alternate embodiment, a testing module of system 10 performs multiple levels of tests to speed up the process of determining which of the chunks are identical and to which previously remembered chunk a given chunk corresponds to. These multiple levels of test may have increasing levels of accuracy. As the accuracy increases, the probability of false positives in identifying duplicate data decreases. However, higher accuracy tests may be more expensive to perform.

System 10 may use the least expensive test, an approximate test, initially. If the approximate test is positive indicating that the data in the window is a duplicate chunk, system 10 progresses to the next level of test accuracy. For example, system 10 may use a rolling checksum for the mathematical function of the least expensive, least accurate approximate test. If system 10 is using an optional approximate test in method 400, system 10 remembers the information used for the approximate test at step 450. In the embodiment with a rolling checksum used as the approximate test, system 10 inserts the rolling checksum for the residue chunk into a hash table.

Given some data to chunk, system 10 essentially tries to divide the data into consecutive blocks. If a block is not likely to have been seen before, the process tries to shift the chunking in case previously seen blocks are now offset differently. To determine the shift amount, system 10 tests all possible shift positions.

Figure 5:
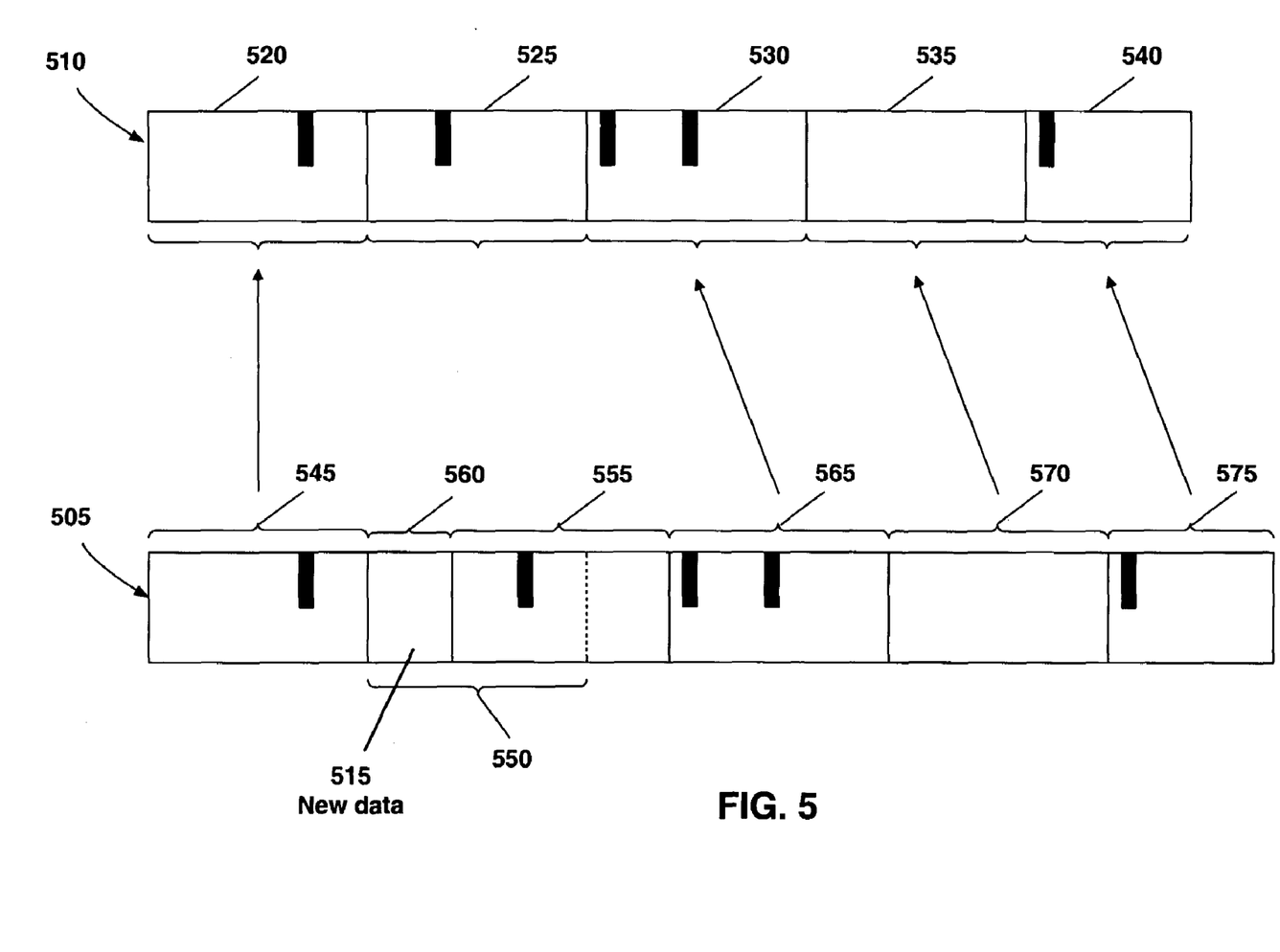
FIG. 5 is a schematic illustration portraying the operation of the data chunking system of the present invention.

FIG. 5 illustrates an example of chunking by system 10 using method 400. System 10 chunks data 505 and compares chunks in data 505 to previously chunked data 510. Data 505 is identical to data 510 except for the insertion of new data 515. For ease of illustration, data 515 has been inserted at the beginning of chunk 525. The same method 400 applies when data is inserted anywhere in a data stream. Data 510 has been chunked into blocks 520, 525, 530, 535 of size k and chunk 540 of size less than k.

System 10 selects a chunk 545 of size k in data 505 and compares it to remembered chunks (520, 525, 530, 535, 540), finding a match with block 520. Chunk 545 is then designated as a duplicate chunk by system 10. System 10 then selects the next chunk of size k, chunk 550, and compares chunk 550 with all the remembered chunks. As no matches are found, system 10 shifts a window 555 of size k to the right one byte and checks again for matches.

As window 555 is shifted to the right, a small chunk or residue 560 grows between chunk 545 and the boundary for window 555. System 10 continues shifting window 555 until a match is found for the data in window 555 or until residue 560 is size k, the size of a block. System 10 finds that the data in window 555 matches chunk 525 when new data 515 has been passed. System 10 then designates residue chunk 560 as a unique chunk and the data in window 555 as a duplicate chunk.

System 10 selects the next chunk of size k, chunk 565 and compares it to all remembered data, finding a match in chunk 530. Similarly, chunk 570 matches chunk 535 and chunk 575 matches chunk 540. Consequently, system 10 is able to locate duplicate chunks in data 505 for all but chunk 560, which comprises new data 515. In addition, the chunks formed by system 10 are predominantly the same size.

Figure 6:
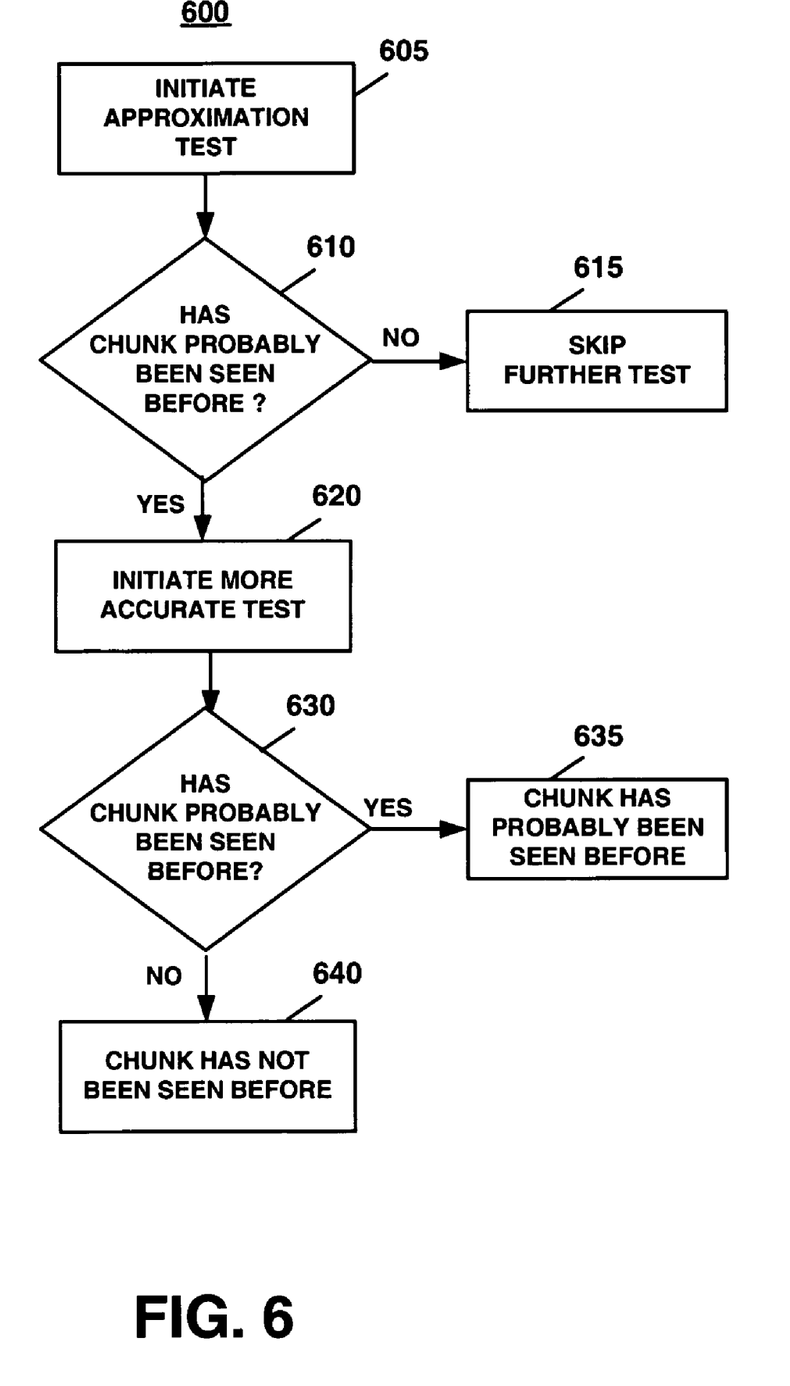
FIG. 6 is a process flow chart illustrating a method of operation of the data chunking system of the present invention using an approximation test to determine whether data chunks are redundant.

An alternate embodiment of system 10 that speeds up the method of determining whether the data in the window is identical to a previously remembered chunk is illustrated by method 600 of FIG. 6. In steps 410 and 430, instead of rigorously testing at 100% accuracy whether the data in the window is identical to a previously remembered chunk, system 10 may use an approximation to determine whether, for example, two chunks are identical with 90% accuracy. If the approximation method indicates that the two chunks are likely to be the same, then system 10 tests again using a more accurate test. In another embodiment, the approximate test is performed by computing a rolling checksum of the data and looking up the computed value in a hash table.

This approximation test is illustrated by method 600 of FIG. 6. At step 605, system 10 initiates an approximation test. At step 610, system 10 determines whether the data in the window has probably been seen before. If not, system 10 skips the accurate test at step 615, and returns "no" at steps 410 or 430 of method 400 in FIG. 4.

If the data in the window has probably been seen before (step 610), system 10 initiates a more accurate test in step 620. In a preferred embodiment, the more accurate test involves computing a cryptographic hash of the data in the window and looking up the computed value in a hash table.

If the computed hash value does not exist in the hash table, system 10 concludes that the data in the window has not been seen before at step 640, equivalent to returning "no" at steps 410 or 430 of method 400 in FIG. 4. Otherwise, the system concludes that the data in the window is very likely to have been seen before (step 635) and a further more accurate test can be performed to confirm that the data in the window is indeed a duplicate chunk. In a preferred embodiment, the further test is performed by reading the earlier chunk that has the same hash value and comparing it with the data in the window.

In an alternate embodiment, system 10 determines the shift amount of the window, x, by examining the marker or markers within the data in the window. A marker is a specific pattern in the data. The marker may be a sequence of bytes such that some mathematical function of the data results in a certain bit pattern or it may be as simple as a full stop or a period.

Even using method 400 with an approximation test, system 10 still has to check whether the data in the window is likely to have been seen before every time the window is shifted by x bytes. Rather than shifting the window by a fixed value of x bytes, this alternate embodiment utilizes the offsets of markers from the chunk boundary to shift the window.

System 10 looks for a marker inside the data in the window and determines whether this particular occurrence of the marker has been seen before. In one embodiment, system 10 associates a marker with a mathematical function of the data around the marker to identify that marker. In another embodiment, the mathematical function is a cryptographic hash. If the marker in the data in the window has been seen before, then system 10 determines the remembered offset from the chunk boundary the last time this marker was seen. System 10 can then shift the window using the value of the remembered offset to align the data in the window with the previous chunk containing the same marker.

The marker may be any pattern as long as the same pattern is used for remembering a marker and for looking it up. In a further embodiment, system 10 computes Rabin's fingerprint, looking for the positions in the data where the last few (y) bits of the computed fingerprint are zeroes. By appropriately choosing a value for y, system 10 can control the expected separation of the markers to be close to or smaller than k, the desired block size.

Figure 7:
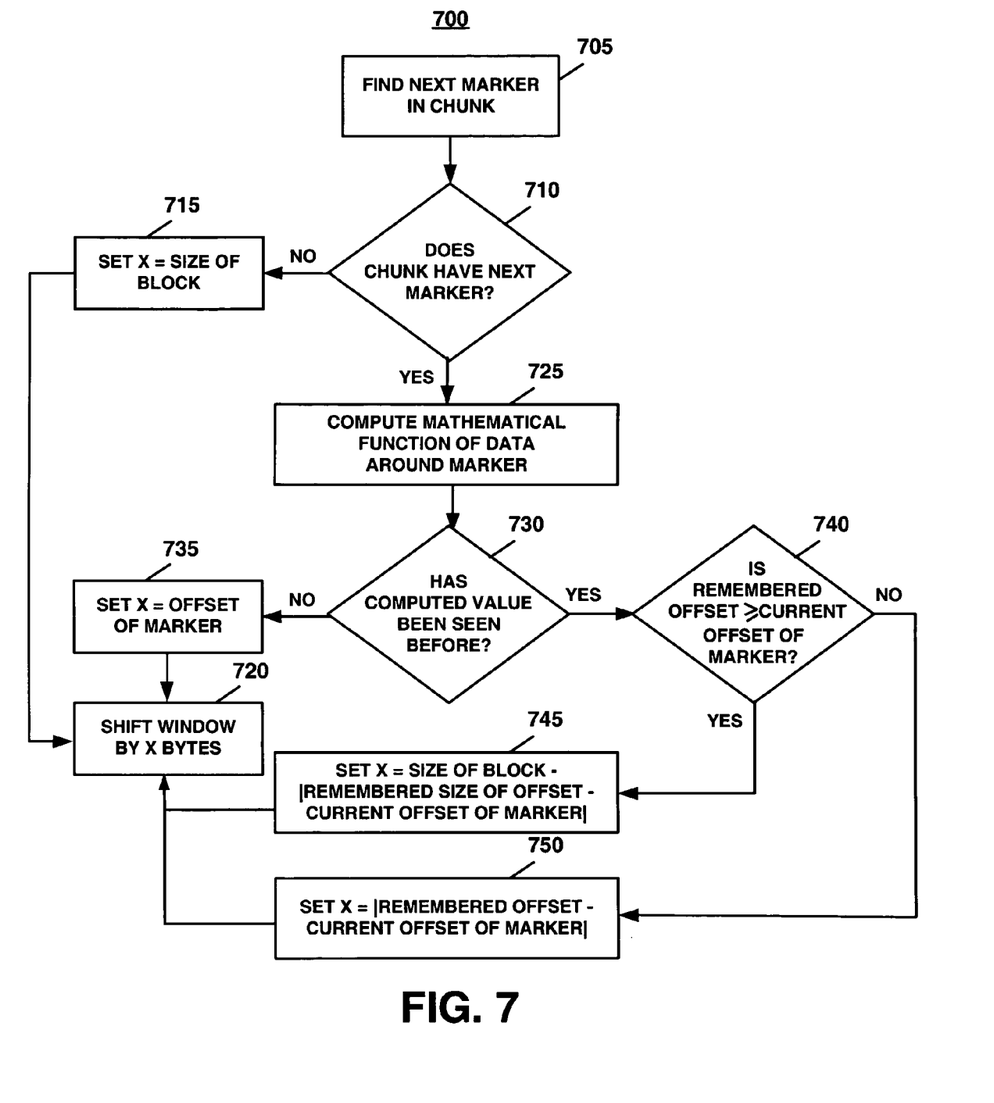
FIG. 7 is a process flow chart illustrating a method of operation of the data chunking system of the present invention using data markers to match and align data chunks.

This alternate embodiment replaces block 425 of method 400 with method 700 of FIG. 7, and at step 445, system 10 divides the residue chunk into consecutive chunks of unique data of size k, that are possibly followed by a chunk of size less than k. For each of these chunks, system 10 additionally remembers at step 450 the first marker in the chunk and the chunk offset of the marker. Method 700 of system 10 uses markers to determine the amount x that the window is shifted before checking if the data in the window has been seen before.

At step 705, system 10 finds the next marker in the data in the window. If system 10 determines that the data in the window does not have a next marker at step 710, system 10 sets x equal to k, the desired size of a block, at step 715. System 10 then shifts the window by x bytes at step 720; in this case, system 10 shifts the window by a complete block. In an alternate embodiment, if the data in the window does not have a next marker, system 10 shifts the window by a fixed amount and uses method 400 with an approximation test.

If the data in the window is found to have a next marker at step 710, system 10 computes a mathematical function of the data around the marker at step 725. System 10 then determines at step 730 whether the computed value of step 725 has been seen before. If the computed value has not been seen before, system 10 sets x equal to the offset of the marker from the beginning of the window and shifts the window by x bytes at step 720.

If, at step 730, the computed value for the data around the marker has been seen before, system 10 determines at step 740 whether the remembered chunk offset of the marker is greater than or equal to the current offset of the marker from the beginning of the window. If the remembered offset is greater than, or equal to the current offset of the marker, system 10 sets x at step 745 as follows:

$$x = k - |\text{remembered size of offset} - \text{current size of offset}|$$

where k represents the desired block size. Otherwise, system 10 sets x at step 750 as follows:

$$x = |\text{remembered size of offset} - \text{current size of offset}|.$$

System 10 then shifts the window by x bytes at step 720.

The alternate embodiment of method 400 that uses method 700 checks to see if the initial k bytes of R' is likely to have been seen before. If not, method 700 tries to determine the shift amount of the window by matching up the value computed at the next marker position with a stored value. A further embodiment of system 10 matches the computed value with a stored value before performing any checking, i.e., system 10 performs method 700 immediately after step 405 of method 400 rather than as step 425 of method 400.

The set of data to be processed by system 10 may be incrementally increased over time. The remembered information (e.g., hash tables) may be stored in persistent storage such as disks. New data may be added to the remembered information as it is processed. In addition, the data to be processed may be geographically distributed. Consequently, the remembered information may be moved to different locations for efficient processing and storage.

Because data usage tends to exhibit temporal locality, any duplicate data blocks are likely to occur close together in time. In a preferred embodiment, the remembered information is aged out or forgotten with the passage of time so that only the information pertaining to data processed during a preceding period of time is remembered. In yet another embodiment, the hash tables have a maximum size and the oldest information in the tables are removed whenever the tables exceed their maximum size.

It is to be understood that the specific embodiments of the invention that have been described are merely illustrative of certain applications of the principle of the present invention. Numerous modifications may be made to the system and method for dividing data into predominantly fixed-sized chunks such that duplicate data chunks may be identified invention described herein without departing from the spirit and scope of the present invention. Moreover, while the present invention is described for illustration purpose only in relation to data storage and the Internet, it should be clear that the invention is applicable as well to, for example, any application where the identification of redundant data would be a benefit.

What is claimed is:

1. A processor implemented method of identifying duplicate data chunks in a data stream by dividing the data stream into fixed-size chunks, the method, comprising:
   sliding a window of a fixed size, over the data chunks;
   tracking a residue data that has been slid over by the window and that has not yet been emitted as a chunk; and
   testing if a data within the window has been previously seen; and
   upon determination that the data within the window has been previously seen, emitting as one or more unique chunks the residue data that has been slid over, and further emitting the data in the window as a duplicate chunk.

2. The method of claim 1, wherein testing if the data within the window has been previously seen comprises testing whether the data within the window is likely to have been seen before.

3. The method of claim 1, further comprising sliding the window forward by a predetermined number of bytes.

4. The method of claim 1, further comprising sliding the window by a number of bytes that is determined by an offset from a beginning of the chunk, the offset being associated with a marker in the data within the window.

5. The method of claim 4, wherein the marker comprises a predetermined pattern that appears substantially consistently throughout the data.

6. The method of claim 1, further comprising emitting as one or more chunks, residue data that has been slid over by the window but not yet emitted, if the size of the residue data exceeds the size of the block.

7. The method of claim 1, further comprising remembering the chunk by computing a plurality of functions relative to the data in the chunk, and further remembering resulting computed values.

8. The method of claim 7, further comprising testing whether the data in the window is likely to have been seen before by computing one or more of the plurality of functions relative to the data; and
   further checking to determine if the computed value is one of the resulting computed values that have been remembered.

9. The method of claim 8, wherein testing whether the data in the window is likely to have been seen before comprises performing a first least accurate and least expensive test; and
   then performing a second more accurate and more expensive test only if the first test is positive.

10. The method of claim 8, wherein remembering the chunk further comprises looking for predetermined patterns in the chunk, and remembering the occurrences of the predetermined patterns and corresponding offsets from the beginning of the chunk.

11. The method of claim 1, wherein testing whether the data in the window is likely to have been seen before further comprises looking for the patterns in the data.

12. The method of claim 11, further comprising checking to determine if the occurrences of any the predetermined patterns in the data in the window have been remembered.

13. The method of claim 12, further comprising looking up the corresponding offset that has been remembered, when the patterns have been remembered.

14. The method of claim 13, further comprising sliding the window by using the remembered offsets to line up the window with a previously seen chunk.

15. The method of claim 10, wherein looking for specific patterns in the data is performed by computing a mathematical function over subsequences of the data and finding computed values with certain values.

16. The method of claim 15, wherein remembering the occurrences of the specific patterns is implemented by computing a supplemental mathematical function of data near the specific patterns, and by remembering corresponding computed values.

17. The method of claim 1, wherein testing if the data within the window has been previously seen comprises determining whether the data within the window has been previously seen within a preceding period of time.

18. The method of claim 1, wherein testing if the data within the window has been previously seen comprises determining whether the data within the window has been previously seen within a predetermined amount of preceding data.

19. The method of claim 2, wherein testing if the data within the window has been previously seen comprises determining whether the data within the window has probably been previously seen within any of a preceding period of time or within an amount of preceding data.

20. A processor implemented system of identifying duplicate data in a data stream by dividing the data stream into fixed-size chunks, the system, comprising:
   a window of a fixed size that is stored into memory and, that is slid over the data chunks;
   a residue data that has been slid over by the window, that has not yet been emitted as a chunk, and that is tracked; and a test module that determines if a data within the window has been previously seen; and upon determination that the data within the window has been previously seen, the residue data that has been slid over is emitted as one or more unique chunks, and the data in the window is emitted as a duplicate chunk.

21. The system of claim 20, wherein the test module tests whether the data within the window is likely to have been seen before.

22. The system of claim 20, wherein the window is slid forward by a predetermined number of bytes.

23. The system of claim 20, wherein the window is slid by a number of bytes that is determined by an offset from a beginning of the chunk, the offset being associated with a marker in the data within the window.

24. The system of claim 23, wherein the marker comprises a predetermined pattern that appears substantially consistently throughout the data.

25. The system of claim 20, wherein the residue data that has been slid over by the window but not yet emitted, is emitted as one or more chunks if the size of the residue data exceeds the size of the block.

26. The system of claim 20, wherein the chunk is remembered by computing a plurality of functions relative to the data in the chunk, and wherein resulting computed values are also remembered.

27. The system of claim 26, wherein the testing module tests whether the data in the window is likely to have been seen before by computing one or more of the plurality of functions relative to the data, and further checks to determine if the computed value is one of the resulting computed values that have been remembered.

28. The system of claim 27, wherein the test module performs a first least accurate and least expensive test, and then performs a second more accurate and more expensive test only if the first test is positive.

29. The system of claim 20, wherein the test module determines whether the data within the window has been previously seen within any of a preceding period of time or within an amount of preceding data.

30. A computer program product having executable instruction codes stored on a computer readable medium, for identifying duplicate data chunks in a data stream by dividing the data stream into fixed-size chunks, the computer program product, comprising:

a first set of instruction codes stored into memory for sliding a window of a fixed size, over the data chunks;

a second set of instruction codes for tracking a residue data that has been slid over by the window and that has not yet been emitted as a chunk; and a third set of instruction codes for testing if a data within the window has been previously seen; and upon determination that the data within the window has been previously seen, a fourth set of instruction codes emits as one or more unique chunks, the residue data that has been slid over, and further emits as a duplicate chunk the data in the window.

31. The computer program product of claim 30, wherein the third set of instruction codes tests whether the data within the window is likely to have been seen before.

32. The computer program product of claim 30, further comprising a fifth set of instruction codes for sliding the window forward by a predetermined number of bytes.

33. The computer program product of claim 30, wherein the first set of instruction codes slides the window by a number of bytes that is determined by an offset from a beginning of the chunk, the offset being associated with a marker in the data within the window.

34. The computer program product of claim 33, wherein the marker comprises a predetermined pattern that appears substantially consistently throughout the data.

35. The computer program product of claim 30, wherein the fourth set of instruction codes emits as one or more chunks, residue data that has been slid over by the window but not yet emitted, if the size of the residue data exceeds the size of the block.

36. The computer program product of claim 30, further comprising a storage for remembering the chunk by computing a plurality of functions relative to the data in the chunk, and remembering resulting computed values.

37. The computer program product of claim 36, wherein the third set of instruction codes tests whether the data in the window is likely to have been seen before by computing one or more of the plurality of functions relative to the data; and further determines if the computed value is one of the resulting computed values that have been remembered.

38. The computer program product of claim 37, wherein the third set of instruction codes tests whether the data in the window is likely to have been seen before by performing a first least accurate and least expensive test; and then performs a second more accurate and more expensive test only if the first test is positive.

39. The computer program product of claim 30, wherein the third set of instruction codes tests whether the data within the window has been previously seen within any of a preceding period of time or within an amount of preceding data.

* * * * *